(12) United States Patent
Kajino et al.

(10) Patent No.: US 6,830,388 B2
(45) Date of Patent: Dec. 14, 2004

(54) CAMERA ROTATION DEVICE

(75) Inventors: Tetsurou Kajino, Tokyo (JP); Shouichi Tada, Kawasaki (JP)

(73) Assignees: Matsushita Electric Industrial Co., Ltd., Osaka (JP); Nanshin Chemical Industry Co., Ltd, Kanagawa (JP)

( * ) Notice: Subject to any disclaimer, the term of this patent is extended or adjusted under 35 U.S.C. 154(b) by 77 days.

(21) Appl. No.: 10/611,899

(22) Filed: Jul. 3, 2003

(65) Prior Publication Data

US 2004/0062541 A1 Apr. 1, 2004

(30) Foreign Application Priority Data

Jul. 5, 2002 (JP) .................................... 2002-197810

(51) Int. Cl.$^7$ .................... G03B 17/00; F16M 11/18
(52) U.S. Cl. .................... 396/427; 348/143; 348/373
(58) Field of Search .................... 396/427, 428; 348/143, 373

(56) References Cited

U.S. PATENT DOCUMENTS 5,073,824 A 12/1991 Vertin .................... 348/211.2
5,128,770 A * 7/1992 Inana et al. .................... 348/211.4

FOREIGN PATENT DOCUMENTS

| DE | 199 18 389 | 10/2000 | ........... F16M/11/18 |
| EP | 0 990 834 | 4/2000 | ........... F16M/11/18 |
| JP | 2000-55142 | 2/2000 | ............ F16H/1/10 |

* cited by examiner

Primary Examiner—W. B. Perkey
(74) Attorney, Agent, or Firm—Wenderoth, Lind & Ponack, L.L.P.

(57) ABSTRACT

A camera rotation device comprises motors provided on rotated sides rotating with a camera with respect to their rotating sides which rotate the camera. More specifically, regarding a pan direction, a pan motor is provided in a pan section which rotates with respect to a base section. With regard to a tilt direction, a tilt motor is provided in a tilt section which rotates with respect to the pan section. Torque of each motor is transferred to each rotating side so that the camera on the rotated side rotates with the motor by reaction force of the rotating side. This structure, in comparison with conventional devices where a motor and a rotation mechanism are provided separately, has a motor provided on the rotated side and therefore reduces space for mounting a motor. As a result, this configuration enables the camera rotation device to be made smaller.

21 Claims, 9 Drawing Sheets

CAMERA ROTATION DEVICE

BACKGROUND OF THE INVENTION

1. Field of the Invention

The present invention relates to a camera rotation device and, more particularly, to miniaturization of a camera rotation device.

2. Description of the Related Art

A monitoring or surveillance camera rotation device is previously known as an example of a camera rotation device. A common surveillance camera rotation device has a chassis which can be mounted on ceilings or the like, and a mechanism for supporting a camera so that the camera can rotate in pan and tilt directions with respect to the chassis. In addition, a motor for rotating the camera is mounted on the chassis.

As mentioned above, conventional devices have a motor provided separately from the camera rotation mechanism on the chassis. Generally speaking, with conventional devices, a space is reserved beneath a stage floor on which a camera is to be mounted and rotated, with a motor then being located in this space. Such conventional devices are therefore larger and relatively more expensive because space is required to mount the motor so as to be separate from the camera rotation mechanism. Thus, it is desired to realize a smaller-sized and less expensive rotation device.

SUMMARY OF THE INVENTION

To solve the above problems, it is an object of the present invention to provide a small-sized camera rotation device.

One aspect of the present invention is a camera rotation device comprising a motor provided on a rotated side (swiveled side) rotating with a camera with respect to a rotating side (swiveling side) which rotates the camera; and a torque (rotating force) transfer means for transferring torque (rotating force) of the motor to the rotating side and thus rotating the motor as well as the camera on the rotated side by reaction force of the rotating side. In comparison with that of the conventional devices which have the motor on the chassis separate from the rotation mechanism, this structure reduces space for mounting the motor and allows a smaller rotation device.

When the rotation device has two or more rotation mechanisms for two or more rotation directions (typically a pan direction and a tilt direction), the present invention can be applied to one or more of the mechanisms Another aspect of the present invention is a camera rotation device comprising a base section; a pan section operable to rotate in a pan direction with respect to the base section; a pan motor provided in the pan section; a pan torque transfer means for transferring torque of the pan motor to the base section and rotating the pan section by reaction force of the base section; a tilt section operable to rotate in a tilt direction with respect to the pan section; a tilt motor provided in the tilt section; and a tilt torque transfer means which transfers torque of the tilt motor to the pan section and rotates the tilt section by reaction force of the pan section. The pan motor and the tilt motor are respectively mounted in the pan section and the tilt section. Thus, in comparison with the conventional devices which have a motor on a base, the rotation device according to the present invention needs less space for mounting the motors and can be smaller in size.

The camera rotation device according to the present invention may further comprise a pan torque transfer means and a tilt torque transfer means composed of spur gears. Spur gears are reversible. That is, spur gears on the rotating side and the rotated side spin each other even when a person rotates the camera by hand. The above structure therefore makes it possible to avoid putting a strain on the torque transfer means even if someone carelessly, as a prank or the like, rotates the camera by hand. Accordingly, failure of the rotation device will be avoided.

Furthermore, in the camera rotation device according to the present invention, the pan torque transfer means may comprise a pan end gear fixed to the base section and at least one pan intermediate reduction gear interposed between the pan motor and the pan end gear, and the tilt torque transfer means may comprise a tilt end gear fixed to the pan section and at least one tilt intermediate reduction gear interposed between the tilt motor and the tilt end gear. This structure, having a reduction gear mechanism, optimizes the swiveling speed.

The pan intermediate reduction gear is, like the pan motor, provided preferably in the pan section. This saves space and further miniaturizes the device compared to the case of the pan intermediate reduction gear being provided on the base. It is also preferable to provide the tilt intermediate reduction gear in the bit section, as the gear only requires a small amount of space and the device can be smaller.

Moreover, a camera rotation device according to the present invention may have a structure in which at least one of the pan intermediate reduction gears and at least one of the tilt intermediate reduction gears are used in common with each other. This structure reduces costs by providing commonality of parts. Commonality of parts also lightens the workers' workload of discriminating among parts during assembly, and therefore facilitates assembly tasks and increases productivity.

Still another aspect of the present invention is a camera rotation device comprising a base section; a first rotation section provided rotatably in a first direction with respect to the base section; a first rotation drive means which rotates the first rotation section with respect to the base section; a second rotation section provided rotatably in a second direction with respect to the first rotation section; and a second rotation drive means which rotates the second rotation section with respect to the first rotation section. In this device, at least one of the first rotation drive means and the second rotation drive means comprises a motor provided on a rotated side; and a torque transfer means which transfers torque of the motor on the rotated side to a rotating side and therefore rotates the motor as well as the rotated side by reaction force of the rotating side. Rotation directions of this structure are not limited to a pan direction and a tilt direction. Furthermore, the structure of the present invention, which has a motor mounted on the rotated side, can be applied to one of the two rotation mechanisms for each direction as well as to both directions as a matter of course. This structure, as is the case with the structure mentioned in the preceding paragraphs, allows a smaller camera rotation device.

In the camera rotation device according to the present invention, the torque transfer means may be composed of spur gears. As described above, this structure allows the torque transfer means to be reversible, and therefore makes it possible to avoid a strain put on the torque transfer means. Thus, failure of the rotation device will be avoided.

In the camera rotation device according to the present invention, the torque transfer means may comprise a stationary gear fixed to the rotating side and at least one intermediate reduction gear interposed between the motor and the stationary gear. This structure makes the device smaller because of the reason mentioned above.

In the camera rotation device according to the present invention, both the first rotation drive means and the second rotation drive means may comprise the motor and the torque transfer means, and at least one each of the intermediate reduction gears provided on the two torque transfer means of the first rotation drive means and the second rotation drive means may be in common with each other. This structure reduces costs for the reasons mentioned above. Moreover, the structure facilitates assembly tasks and therefore increases productivity.

BRIEF DESCRIPTION OF THE DRAWINGS

The above and other features and aspects of the present invention will become more apparent upon reading the following detailed description in conjunction with the accompanying drawings, in which.

DETAILED DESCRIPTION OF THE PREFERRED EMBODIMENT

The preferred embodiment of the present invention will now be described with reference to the drawings.

Figure 1:
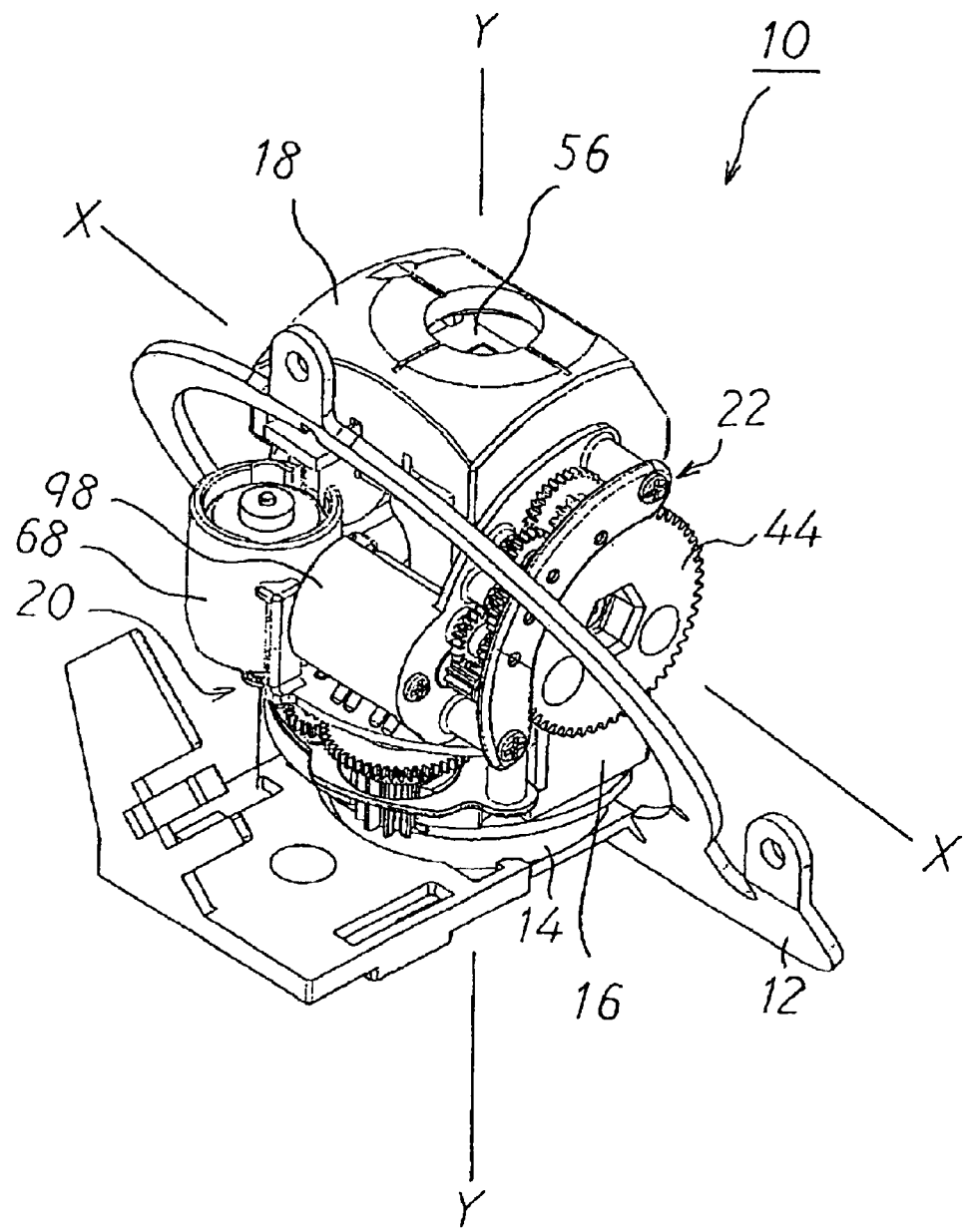
FIG. 1 is a perspective view showing a camera rotation device of the preferred embodiment according to the present invention.
Figure 2:
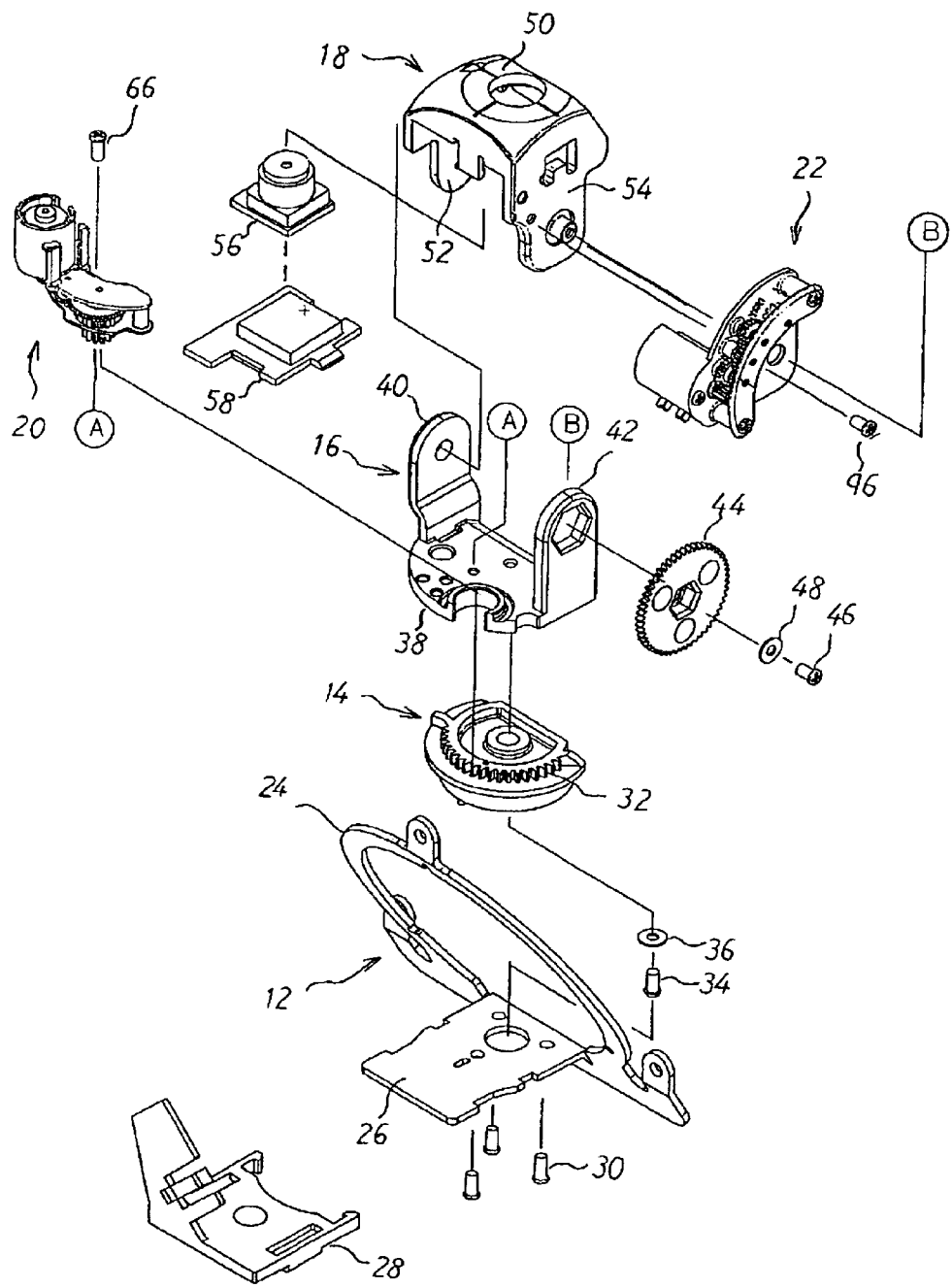
FIG. 2 is an exploded view of the camera rotation device shown in FIG. 1.

FIG. 1 shows a rotation type camera apparatus having a camera rotation device 10 of the preferred embodiment, and FIG. 2 is an exploded view of the camera rotation device 10.

The camera rotation device 10 is applied, for example, to a monitoring or surveillance camera. The camera rotation device 10 can also be used in a computer system. By using a small camera equipped with the camera rotation device 10 as a network camera, an image from the camera can be provided via networks such as LAN or the Internet. The camera rotation device 10 can also be applied to cameras for any other purposes.

The camera rotation device 10 can rotate about a pan axis Y in a pan direction and about a tilt axis X in a tilt direction. In the following description, an arrangement of the camera rotation device shown in FIG. 1 will be regarded as a standard, and a direction along the pan axis Y is referred to as an up/down direction and a direction along the tilt axis X is referred to as a right/left direction. Also, a direction perpendicular to the tilt axis X in the horizontal plane is referred to as a front/back direction or a forward/backward direction.

Of course, these directions do not need to correspond with the directions during the camera's usage. For example, in the case of applying the camera rotation device 10 to a surveillance camera and if the camera is used inverted, the directions will be upside down.

As shown in FIGS. 1 and 2, the camera rotation device 10 has, from bottom to top, a mounting frame 12 and a main base 14 constituting a base section, a pan base 16 constituting a pan section, and a lens frame 18 constituting a tilt section. Furthermore, the camera rotation device 10 has a pan rotation unit 20 and a tilt rotation unit 22 shown in FIG. 2.

The mounting frame 12 is a pressed and bent iron member and has a ring portion 24 and a main base attaching portion 26 which is bent from the ring portion 24. The ring portion 24 has three flange portions which will be used to attach the ring portion 24 to a housing not shown in the drawings. Also, the main base attaching portion 26 is attached to a code holder 28 which holds codes of a camera and motors.

The main base 14 is fixed on the main base attaching portion 26 using three screws 30. The main base 14 is made of resin and is approximately disc-shaped as shown in the drawing. A pan end gear 32 centered on the pan axis Y is provided in one piece with the main base 14. The pan end gear 32 is a spur gear and corresponds to a rotating side stationary gear in a pan rotation mechanism.

In this preferred embodiment, a rotating side (swiveling side) means a side to rotate (swivel) other members, and a rotated side (swiveled side) means a side to be rotated (swiveled) by other members.

As shown in the drawing, the pan end gear 32 does not need to be provided all around the main base 14. The pan end gear 32 just needs to cover a necessary area of the pan rotation. In this preferred embodiment, the pan rotation angle (horizontal rotation angle) is 140 degrees, so the pan end gear 32 just needs to be provided for the 140-degree-area or more.

The pan base 16 (first rotatable member) is attached to the main base 14 using a screw 34 and a flat washer 36 so that the pan base 16 can rotate about the pan axis Y. The pan base 16 is made of resin and has a flat disc-shaped pan base body 38, and a left wall portion (first arm) 40 and a right wall portion (second arm) 42 which extend upwards from both sides of the pan base body 38, respectively. These portions of the pan base 16 are formed as one piece.

The pan rotation unit 20 is fixed on the pan base body 38 using screw 66. As described later, a gear which is a component of the pan rotation unit 20 comes through a round opening of the pan base body 38 and is in meshing engagement with the pan end gear 32 of the main base 14.

Also, a resin-made tilt end gear 44 is non-rotatably fixed to the outside of the right wall portion 42 of the pan base 16, centered on the tilt axis X. Here, a hexagonal projection of the tilt end gear 44 (which is not shown in the drawing) fits into a hexagonal opening of the right wall portion 42 and therefore prevents the rotation of the tilt end gear 44 with respect to the pan base 16. The tilt end gear 44 is a spur gear and corresponds to a rotating side stationary gear in a tilt rotation mechanism.

A resin-made lens frame (second rotatable member) 18 is attached between the left wall portion 40 and the right wall portion 42 of the pan base 16 so as to be rotatable about the tilt axis X. The lens frame 18 has a frame body 50, and a left hung wall portion 52 and a right hung wall portion 54 which extend downwards from both sides of the frame body 50. These portions of the lens frame 18 are formed as one piece. The left hung wall portion 52 and the right hung wall portion 54 are respectively attached to the left wall portion 40 and the right wall portion 42 of the pan base 16 so as to be rotatable about the tilt axis X. A boss on the tilt axis X protruding outward from the right hung wall portion 54 extends through a hole of the tilt rotation unit 22. The boss is rotatably supported by a center hole of the tilt end gear 44 fixed on the right wall portion 42 of the pan base 16 using a screw 46 and a flat washer 48.

As shown in the drawing, a camera 56 and a camera retainer 58 are attached to the lens frame 18 in this order using a snap fit. This assembly of the lens frame 18 is attached to the pan base 16.

The camera 56 is a small camera which comprises CMOS, CCD or the like. It is also preferable to use a small camera made for a cellular phone. The camera 56 shoots through a round opening provided in the middle of the frame body 50 of the lens frame 18. The camera retainer 58 has a protective cushion between itself and the camera 56.

On the outside of the right hung wall portion 54 of the lens frame 18, the tilt rotation unit 22 is fixed by a screw 96. As described later, a gear which is a component of the tilt rotation unit 22 is in meshing engagement with the tilt end gear 44 which is fixed oh the pan base 16.

Figure 3:
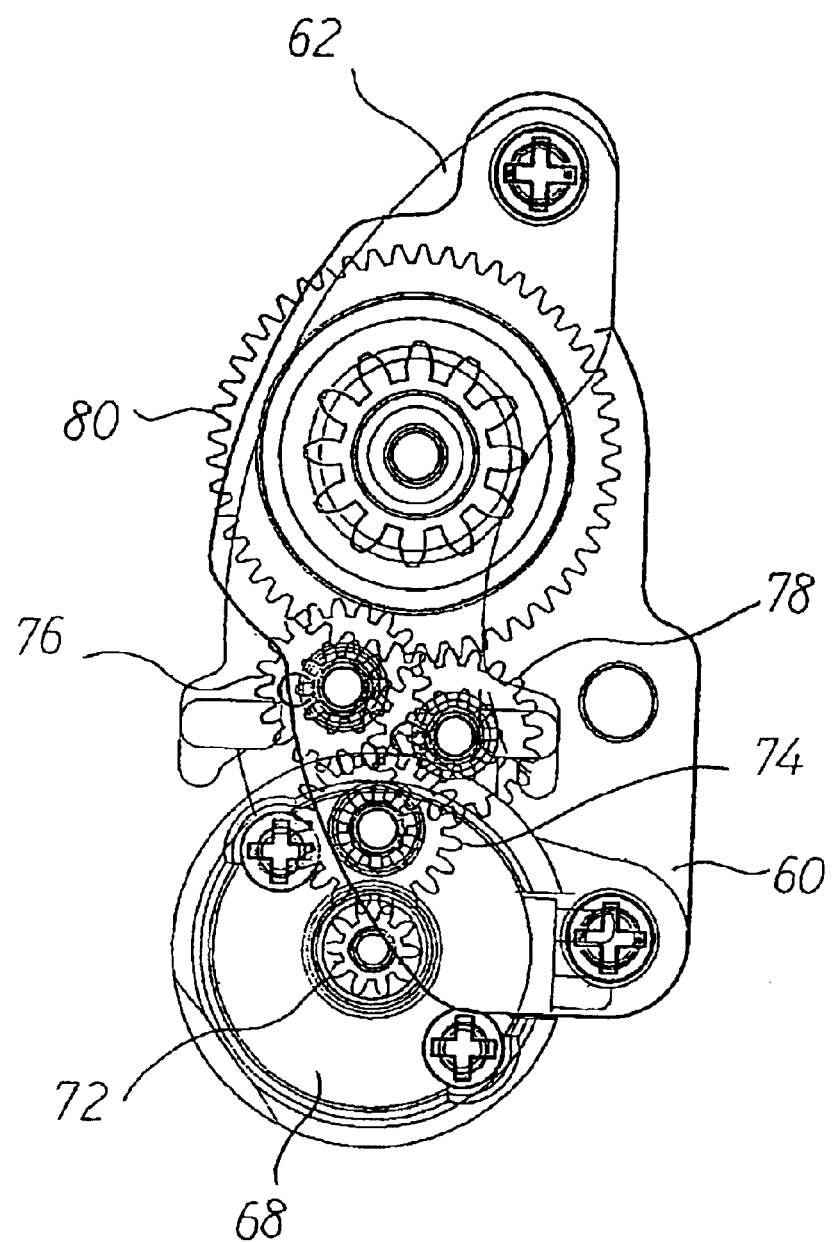
FIG. 3 is a top view of a pan rotation unit provided on the camera rotation device shown in FIG. 1.
Figure 4:
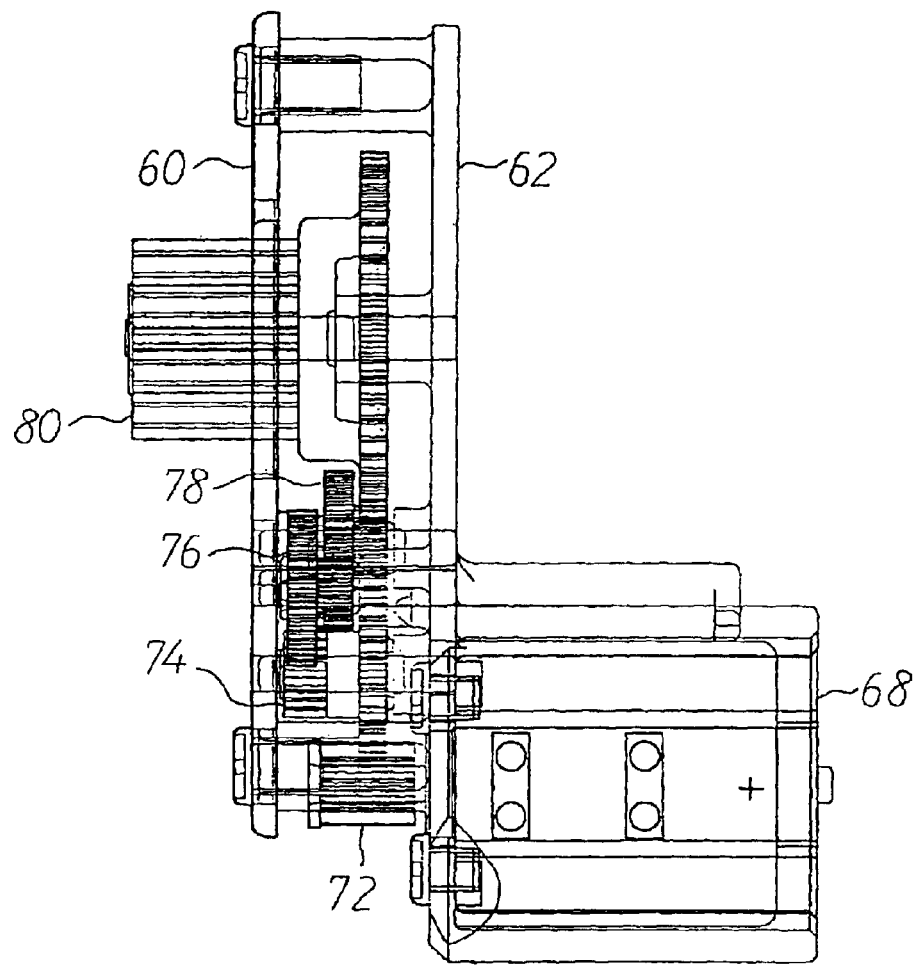
FIG. 4 is a side view of the pan rotation unit provided on the camera rotation device shown in FIG. 1.
Figure 5:
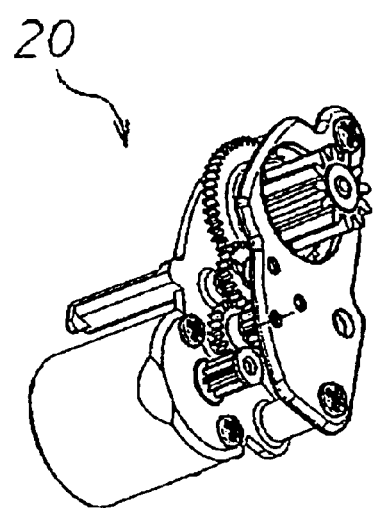
FIG. 5 is a perspective view of the pan rotation unit provided on the camera rotation device shown in FIG. 1.
Figure 6:
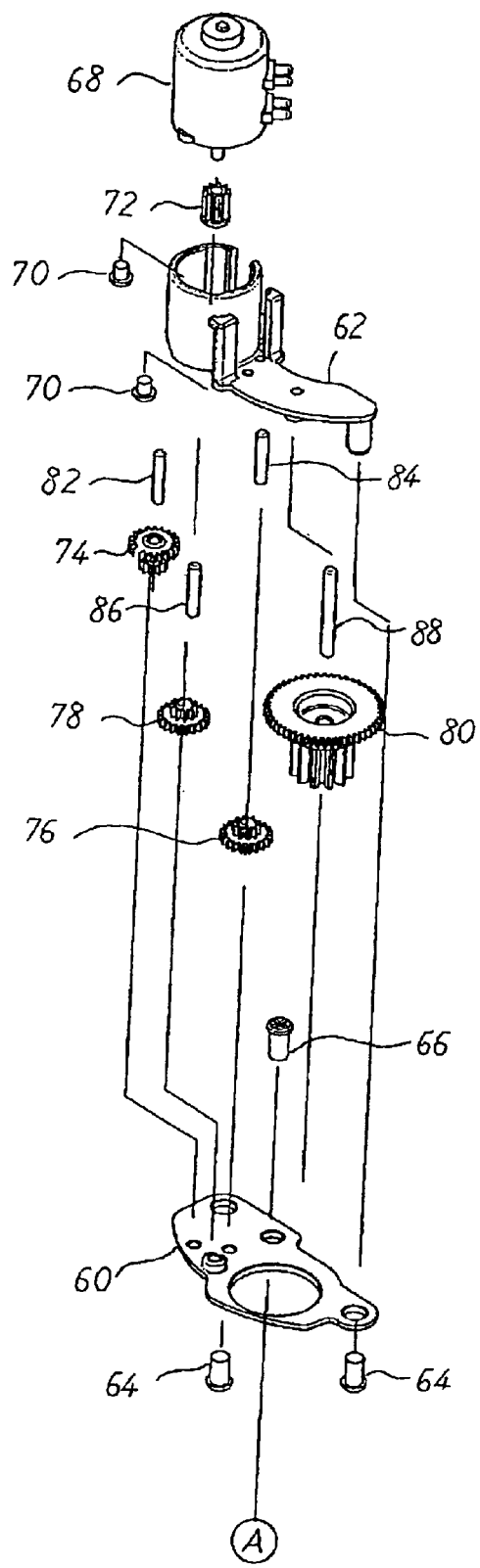
FIG. 6 is an exploded view of the pan rotation unit provided on the camera rotation device shown in FIG. 1.

Next, the structure of the pan rotation unit 20 will be described. FIG. 3 and FIG. 4 are a top view and a side view, respectively, of the pan rotation unit 20. FIG. 5 is a perspective view of the pan rotation unit 20. FIG. 6 is an exploded view of the pan rotation unit 20.

The pan rotation unit 20 has a lower plate 60 and an upper plate 62 which are made of resin. A set of bosses protrudes downward from the upper plate 62.

For each boss, a screw 64 is tightened from the downside through the lower plate 60, thus separating the lower plate 60 and the upper plate 62 at a distance equivalent to the boss's height. The lower plate 60 is fixed on a top face of the pan base body 38 of the pan base 16 by the screw 66.

On the top face of the upper plate 62, a pan motor 68 is fixed by two screws 70. As shown in the drawing, a cylindrical wall portion (cylindrical wall) which is formed in one piece with the upper plate 62 extends upward to cover the pan motor 68. The cylindrical wall portion makes the pan motor 68 less visible from the outside. For example, if an exterior surface of the pan motor 68 is silver or the like, a black resin cylinder can hide the motor.

The pan motor 68 is a stepping motor. A resin-made pan drive gear 72 is fixed to a rotary shaft of the pan motor 68. The pan drive gear 72 is a spur gear which comes through a round opening of the upper plate 62 and protrudes between the upper plate 62 and the lower plate 60.

Furthermore, between the upper plate 62 and the lower plate 60, a first pan reduction gear 74, a second pan reduction gear 76, a third pan reduction gear 78, and a fourth pan reduction gear 80 are rotatably supported by gear shafts 82, 84, 86, and 88 respectively. Each of the four pan reduction gears 74 through 80 is made of resin and has a large diameter gear and a small diameter gear. All of these gears are spur gears. The second pan reduction gear 76 and the third pan reduction gear 78 are the same part. The gear shafts 82 and 86 are the same part.

The pan drive gear 72 of the pan motor 68 is in meshing engagement with the large diameter gear of the first pan reduction gear 74, and the small diameter gear of the first pan reduction gear 74 is in meshing engagement with the large diameter gear of the second pan reduction gear 76. Likewise, the small diameter gear of the second pan reduction gear 76 is in meshing engagement with the large diameter gear of the third pan reduction gear 78, and the small diameter gear of the third pan reduction gear 78 is in meshing engagement with the large diameter gear of the fourth pan reduction gear 80.

The small diameter gear of the fourth pan reduction gear 80 comes through a round opening of the lower plate 60 and protrudes downwards. When the pan rotation unit 20 is fixed to the pan base 16, the small diameter gear of the fourth pan reduction gear 80 comes through a round opening of the pan base body 38 of the pan base 16 and meshes with the pan end gear 32 of the main base 14.

In this way, the pan drive gear 72, the four pan reduction gears 74 to 80, and the pan end gear 32 compose a gear reduction mechanism. The pan drive gear 72 has 10 teeth. Each of the first through third pan reduction gears 74, 76, and 78 has 20 teeth on the large diameter gear and 10 teeth on the small diameter gear, and the fourth pan reduction gear 80 has 50 teeth on the large diameter gear and has 12 teeth on the small diameter gear. Therefore, a reduction ratio of the gear reduction mechanism is:

$$(2/4) \times (2/4) \times (2/4) \times (2/10) \times (4.8/17.2) = 1/143.33.$$

Figure 7:
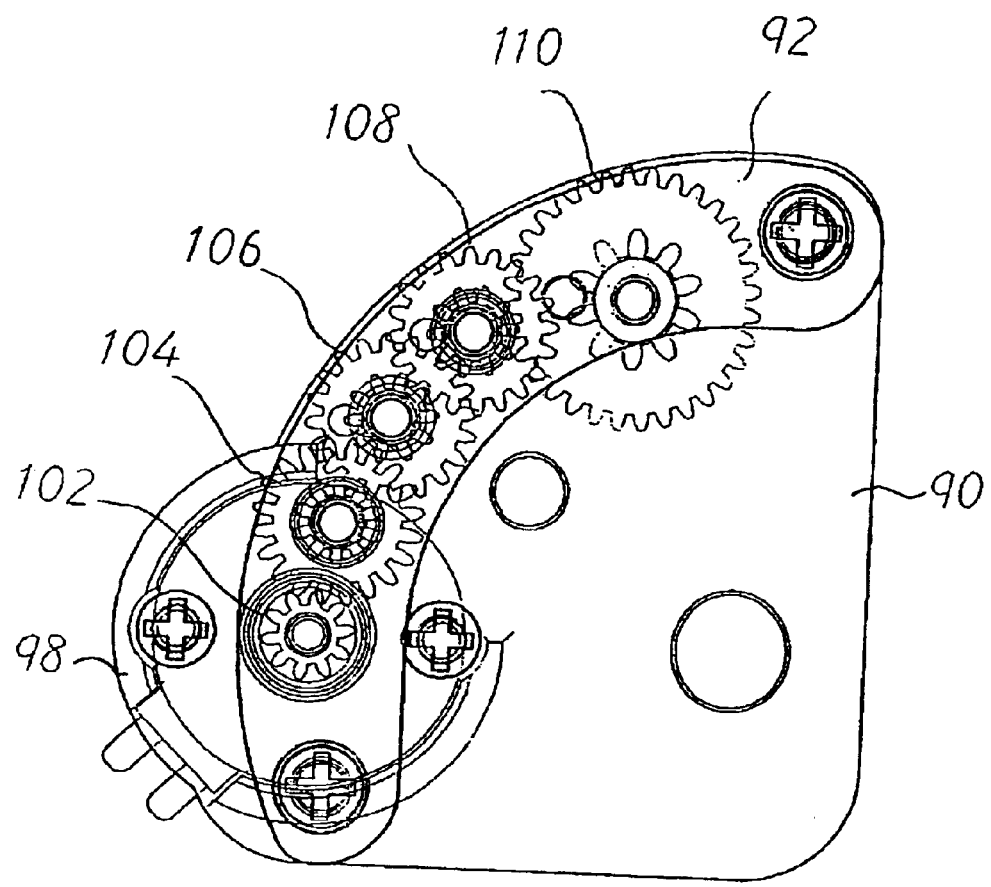
FIG. 7 is a top view of a tilt rotation unit provided on the camera rotation device shown in FIG. 1.
Figure 8:
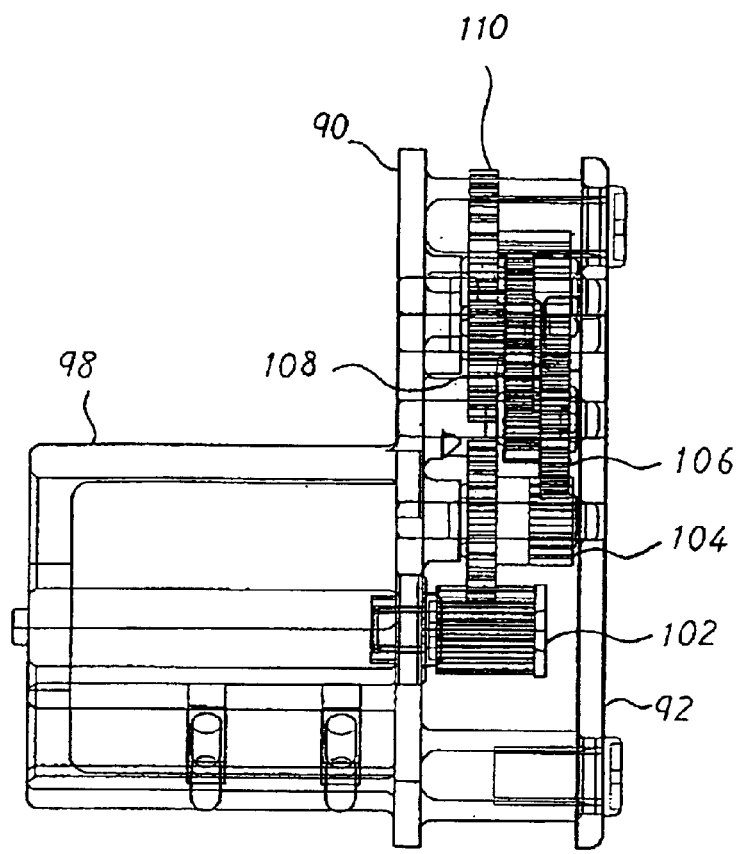
FIG. 8 is a side view of the tilt rotation unit provided on the camera rotation device shown in FIG. 1.
Figure 9:
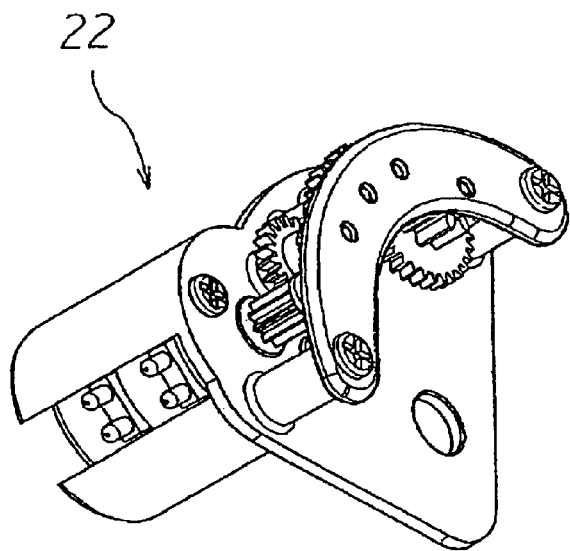
FIG. 9 is a perspective view of the tilt rotation unit provided on the camera rotation device shown in FIG. 1.
Figure 10:
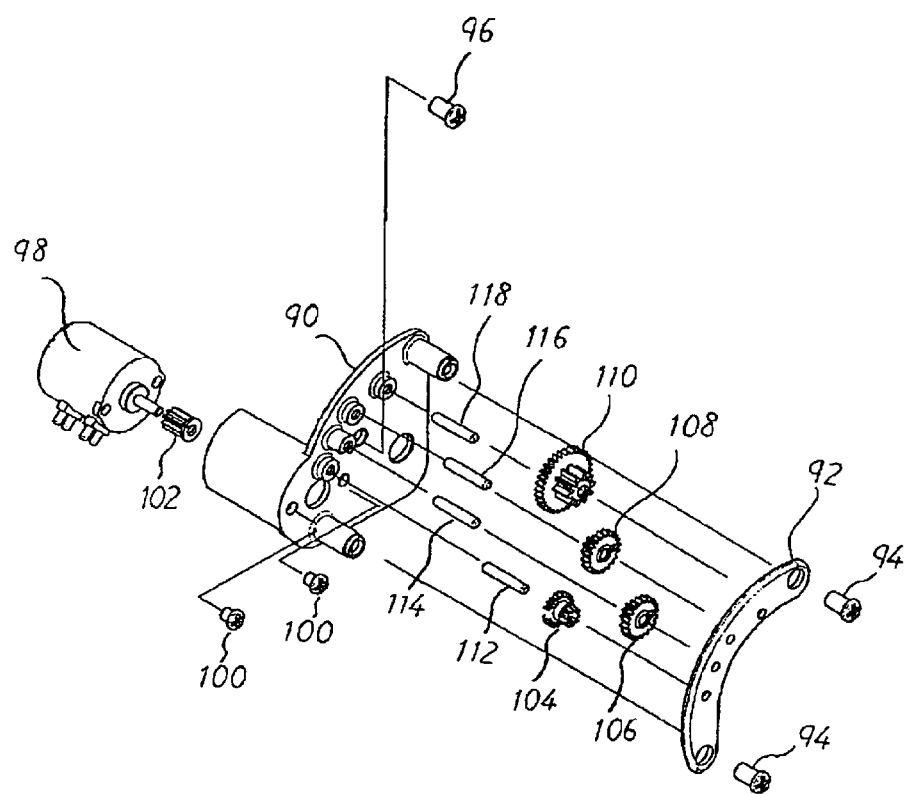
FIG. 10 is an exploded view of the tilt rotation unit provided on the camera rotation device shown in FIG. 1.

Next, the structure of the tilt rotation unit 22 will be described. FIG. 7 and FIG. 8 are a top view and a side view of the tilt rotation unit 22, respectively. FIG. 9 is a perspective view of the tilt rotation unit 22. FIG. 10 is an exploded view of the tilt rotation unit 22.

The tilt rotation unit 22 is the same in principle as the pan rotation unit 20. However, as compared to the pan rotation unit 20 which is fixed to the pan base 16 and rotates the pan base 16 (rotated side) with respect to the main base 14 (rotating side), the tilt rotation unit 22 is fixed to the lens frame 18 and rotates the lens frame 18 (rotated side) with respect to the pan base 16 (rotating side).

The tilt rotation unit 22 has an inside plate 90 and an outside plate 92 which are made of resin. A set of bosses protrudes from the inside plate 90 toward the outside plate 92. For each boss, a screw 94 is tightened through the outside plate 92, thus separating the inside plate 90 and the outside plate 92 at a distance equivalent to the boss's height. The inside plate 90 is fixed outside of the left hung wall portion 54 of the lens frame 18 by a screw 96.

On the pan axis Y side of the inside plate 90, a tilt motor 98 is fixed by two screws 100. As shown in the drawing, a cylindrical wall portion (cylindrical wall) which is formed in one piece with the inside plate 90 extends away from the outside plate 92 to cover the outer circumference of the tilt motor 98. The cylindrical wall portion makes the tilt motor 98 less visible from the outside. For example, if an exterior surface of the tilt motor 98 is a silver color or the like, a black resin cylinder can hide the motor.

The tilt motor 98 is a stepping motor. A resin-made tilt drive gear 102 is fixed to a rotary shaft of the tilt motor 98. The tilt drive gear 102 is a spur gear which comes through a round opening of the inside plate 90 and protrudes between the inside plate 90 and the outside plate 92.

Furthermore, between the inside plate 90 and the outside plate 92, a first tilt reduction gear 104, a second tilt reduction gear 106, a third tilt reduction gear 108, and a fourth tilt reduction gear 110 are rotatably supported by gear shafts 112, 114, 116, and 118, respectively. Each of the four tilt reduction gears 104 through 110 is made of resin and has a large diameter gear and a small diameter gear. All of these gears are spur gears. The second tilt reduction gear 106 and the third tilt reduction gear 108 are the same parts. Also, the gear shafts 112, 116, and 118 are the same parts.

The tilt drive gear 102 of the tilt motor 98 is in meshing engagement with the large diameter gear of the first tilt reduction gear 104, and the small diameter gear of the first tilt reduction gear 104 is in meshing engagement with the large diameter gear of the second tilt reduction gear 106. Likewise, the small diameter gear of the second tilt reduction gear 106 is in meshing engagement with the large diameter gear of the third tilt reduction gear 108, and the small diameter gear of the third tilt reduction gear 108 is in meshing engagement with the large diameter gear of the fourth tilt reduction gear 110.

The small diameter gear of the fourth tilt reduction gear 110 is in meshing engagement with the tilt end gear 44. Specifically, when the tilt rotation unit 22 is fixed to the lens frame 18 in such a way that the inside plate 90 abuts on the outside of the right hung wall portion 54, the tilt end gear 44 fixed to the right wall portion 42 of the pan base 16 is located between the inside plate 90 and the outside plate 92. This tilt end gear 44 engages the small diameter gear of the fourth tilt reduction gear 110.

In this way, the tilt drive gear 102, the four tilt reduction gears 104 to 110, and the tilt end gear 44 compose a gear reduction mechanism. The tilt drive gear 102 has 10 teeth. Each of the first through third tilt reduction gears 104, 106, and 108 has 20 teeth on the large diameter gear and 10 teeth on the small diameter gear, and the fourth tilt reduction gear 110 has 32 teeth on the large diameter gear and has 10 teeth on the small diameter gear. Therefore, a reduction ratio of the gear reduction mechanism is:

$$(2/4) \times (2/4) \times (2/4) \times (2/6.4) \times (3/15.9) = 1/135.68.$$

The above is a description of the tilt rotation unit 22 structure. The tilt motor 98 of the tilt rotation unit 22 and the pan motor 68 of the pan rotation unit 20 are the same part. Likewise, the tilt drive gear 102 and the pan drive gear 72 are the same part; and the first tilt reduction gear 104 and the first pan reduction gear 74 are the same part. Furthermore, the second and the third reduction gears 106 and 108 and the second and third pan reduction gears 76 and 78 are the same part; the gear shafts 112, 116, and 118 and the gear shafts 82 and 86 are the same part; and the gear shaft 114 and the gear shaft 84 are the same part.

Next, an example of assembly steps for the camera rotation device 10 of this preferred embodiment will now be described. First, the camera 56 and the camera retainer 58 are attached to the lens frame 18. The pan rotation unit 20 and the tilt rotation unit 22 are assembled according to the aforementioned exploded views. Then, the tilt rotation unit 22 is attached to the right hung wall portion 54 of the lens frame 18.

On the mounting frame 12, the main base 14, the pan base 16, and the pan rotation unit 20 are attached in order. The pan rotation unit 20 is fixed to the pan base 16 in such a manner that the fourth pan reduction gear 80 engages the pan end gear 32 of the main base 14.

Furthermore, while the lens frame 18 is rotatably attached to the pan base 16, the tilt end gear 44 is fixed to the pan base 16. At this time, the inside plate 90 of the tilt rotation unit 22 which is attached to the lens frame 18 fits between the right hung wall portion 54 of the lens frame 18 and the right wall portion 42 of the pan base 16. The tilt end gear 44 fits between the inside plate 90 and the outside plate 92 of the tilt rotation unit 22, and engages the fourth tilt reduction gear 110 of the tilt rotation unit 22.

Next, the movement of the camera rotation device 10 of this preferred embodiment will now be described.

When the camera 56 is rotated in the pan direction, the pan motor 68 of the pan rotation unit 20 is driven by the passage of electric current. Of course, the direction of rotation (drive direction) is switched according to which way it is desired to rotate the camera 56.

In the pan rotation mechanism, the pan motor 68 and the four pan reduction gears 74 through 80 of the pan rotation unit 20 are mounted on the pan base 16 (rotated side, swiveled side); and the pan end gear 32 is fixed to the main base 14 (rotating side, swiveling side).

Therefore, the four pan reduction gears 74 through 80 reduce the speed and transfer torque (rotating force) of the pan motor 68 to the pan end gear 32 (rotating side, swiveling side). Since the pan end gear 32 is fixed to the mounting frame 12, reaction force of the pan end gear 32 rotates the pan rotation unit 20 which includes the pan motor 68 itself, and thus rotates the pan base 16 accordingly. Therefore, the camera 56 which is attached to the lens frame 18 on the pan base 16 also rotates about the pan axis Y.

When the camera 56 is rotated in the tilt direction, the tilt motor 98 of the tilt rotation unit 22 is driven by the passage of electric current. Of course, the direction of rotation (drive direction) is switched according to which way the camera 56 is to be rotated.

In the tilt rotation mechanism, the tilt motor 98 and the four tilt reduction gears 104 through 110 of the tilt rotation unit 22 are mounted on the lens frame 18 (rotated side, swiveled side); and the tilt end gear 44 is fixed to the pan base 16 (rotating side, swiveling side).

The four tilt reduction gears 104 through 110 reduce the speed and transfer torque (rotating force) of the tilt motor 98 to the tilt end gear 44 (rotating side, swiveling side). Since the tilt end gear 44 is fixed with respect to the pan base 16, reaction force of the tilt end gear 44 rotates the bit rotation unit 22 which includes the tilt motor 98 itself, and thus rotates the lens frame 18 accordingly. The camera 56 on the lens frame 18 also then rotates about the tilt axis X.

As described above, the camera rotation device 10 of the preferred embodiment comprises a motor provided on a rotated side which rotates with a camera with respect to a rotating side which rotates the camera; and comprises a torque transfer means which transfers torque of the motor to the rotating side and therefore rotates the motor as well as the camera on the rotated side by reaction force from the rotating side.

That is to say, in the pan rotation mechanism, the pan motor 68 is provided on the pan base (which composes the pan section) on the rotated side. Torque of the pan motor 68 goes through a reduction gear mechanism which corresponds to a pan torque transfer means, and is transferred to the main base 14 (which composes the base section) of the rotating side. Then, by reaction force thereof, the pan motor 68 rotates in the pan direction with the pan base 16 and the camera 56 thereon.

Similarly, in the tilt rotation mechanism, the tilt motor 98 is provided on the lens frame (which composes the tilt section) on the rotated side. Torque of the tilt motor 98 goes through the reduction gear mechanism which corresponds to a tilt torque transfer means, and is transferred to the pan base 16 of the rotating side. Then, by reaction force thereof, the tilt motor 98 rotates in the tilt direction with the lens frame 18 and the camera 56 thereon.

As described above, in comparison with conventional devices which have the motor separate from the rotation mechanism, this structure of mounting the motor on the rotated side reduces the required space for mounting the motor and allows a smaller and lighter rotation device.

It can be said that the above structure has a mechanism which completes the rotation function by itself. The above structure thus allows a reduction in size as well as a widely applicable design. In other words, the rotation function is arranged compactly on the rotated side so that a shape of the surrounding case or the like can be determined freely.

Additionally, the camera rotation device 10 of the preferred embodiment has the above torque transfer means composed of spur gears. Spur gears are reversible as a torque transfer mechanism. That is, spur gears on the rotating side and the rotated side spin each other even when someone rotates the camera by hand. The above structure therefore makes it possible to avoid a strain being put on the torque transfer means even if someone carelessly, as a prank or the like, spins the camera by hand. Accordingly, a failure of the rotation device is avoided.

In the camera rotation device 10 of the preferred embodiment, the torque transfer means comprises an end gear fixed to the rotating side and intermediate reduction gears interposed between the motor and the end gear. For the pan direction, the end gear is the pan end gear 32, and the intermediate reduction gears are the four pan reduction gears 74 through 80. For the tilt direction, the end gear is the tilt end gear 44, and the intermediate reduction gears are the four tilt reduction gears 104 through 110. This structure, having the reduction gear mechanisms, optimizes the swiveling speed. The reduction gear mechanisms being composed of spur gears as described above can prevent a failure of the rotation device with the help of the spur gears' reversibility.

Moreover, in the camera rotation device 10 of the preferred embodiment, the above-mentioned intermediate reduction gears are also mounted on the rotated side (the pan base side and the lens frame side) like the motor. Due to this structure, the motor on a driving side and the reduction mechanism on a driven side are arranged on the same base component and complete the rotation function by themselves. This saves space and thus further miniaturizes the device compared to the case of the intermediate reduction gears being provided on the rotating side.

The camera rotation device 10 of the preferred embodiment adopts the gear reduction mechanism for both the pan rotation and the tilt rotation, and uses the same type of reduction gear for the pan and tilt sides. This commonality of parts, which is to use the same parts, reduces cost. Commonality of parts also lightens the workers' workload of discriminating among parts during assembly, and therefore facilitates assembly tasks and increases productivity.

The camera rotation device of the preferred embodiment is suitably accommodated in a case with a dome. To obtain bright imagery during a shooting, the dome is preferably transparent. However, if the dome is transparent, the camera rotation device inside will be see-through. Considering this point, in the preferred embodiment above, it is preferable to make the main base 14, the pan base 16, the lens frame 18, the various gears, and the plates 60, 62, 90, and 92 of black resin (or dark-colored resin, and the same applies hereinafter). Moreover, as described in earlier paragraphs, the pan motor 68 and the tilt motor 98 are covered with the black resin cylinder which is formed in one piece with the plates 62 and 90, respectively. This structure of using black resin makes the camera apparatus less visible from the outside.

The camera rotation device 10 of the preferred embodiment adopts a structure which provides the motor on the rotated side for both the pan and the tilt rotation mechanisms. However, it is also acceptable to adopt such a structure for either pan or tilt rotation mechanism.

In the preferred embodiment, the pan and the tilt directions are the horizontal and the vertical directions, respectively, in the arrangement of the FIG. 1. However, the pan and the tilt directions do not need to be limited to these directions.

Furthermore, the preferred embodiment can be applied to a device which has two rotation mechanisms for any two directions. From this point of view, the camera rotation device of the preferred embodiment above comprises: a base section; a first rotatable member which can rotate in a first direction (about a first axis) with respect to the base section; a first rotation drive means which rotates the first rotatable member with respect to the base section; a second rotatable member which can rotate in a second direction (about a second axis) with respect to the first rotatable member; and a second rotation drive means which rotates the second rotatable member with respect to the first rotation section. In this camera rotation device, at least one of (in the preferred embodiment above, both of) the first rotation drive means and the second rotation drive means comprises: a motor provided on a rotated side; and a torque transfer means which transfers torque of the motor on the rotated side to a rotating side and therefore rotates the motor as well as the rotated side by reaction force from the rotating side. In the preferred embodiment above, the first and the second rotation directions are the pan and the tilt directions, respectively. Also from this point of view, this embodiment has an advantage of being smaller as mentioned in earlier paragraphs.

Moreover, in the preferred embodiment, the plurality of intermediate reduction gears are provided between the motor and the rotating side. The number of these gears, the number of teeth, and other parameters can be suitably adjusted according to the necessary reduction ratio. The intermediate reduction gear is not always necessary. One or more gears can be made of soft resin which makes less noise. Furthermore, within the scope of the present invention, it is acceptable to adopt a torque transfer means other than the gear reduction mechanism such as a belt (including a timing belt) or a chain.

As described in earlier paragraphs, the preferred embodiment has an advantage of having a camera less visible from the outside by making various parts of resin in black or the like. It is also acceptable to cover an appropriate portion of the camera rotation device with black or dark-colored felt and the like to conceal the inside components. This cover suitably changes in shape as the camera rotates. If necessary, it is also acceptable to provide a structure of a bellows or the like.

As described up to this point, the camera rotation device according to the present invention provides the motor on the rotated side so that the motor itself and the camera rotate by reaction force which is created by the motor torque transferred to the rotating side. Therefore, in comparison with conventional devices which have the motor apart from the rotation mechanism, the present invention provides a camera rotation device which has superior advantages of reducing space for mounting the motor, and of allowing a smaller rotation device.

While there has been described what is at present considered to be a preferred embodiment of the invention, it will be understood that various modifications may be made thereto, and it is intended that appended claims cover all such modifications as fall within the true spirit and scope of the invention.

What is claimed is:

1. A camera rotation device, comprising:
   a main base;
   a first rotatable member mounted to said main base and operable to rotate about a first axis with respect to said main base;
   a first rotation drive mechanism mounted to said first rotatable member and operable to rotate said first rotatable member about the first axis, said first rotation drive mechanism including a first motor having an axis of rotation parallel to the first axis;
   a second rotatable member mounted to said first rotatable member and operable to rotate about a second axis with respect to said first rotatable member; and
   a second rotation drive mechanism mounted to said second rotatable member and operable to rotate said second rotatable member about the second axis, said second rotation drive mechanism including a second motor having an axis of rotation parallel to the second axis.

2. The camera rotation device of claim 1, further comprising a camera mounted to said second rotatable member, wherein said first rotatable member, said second rotatable member, and said camera are arranged so that an optical axis of said camera intersects an intersection of the first axis and the second axis.

3. The camera rotation device of claim 2, wherein the first axis is orthogonal to the second axis.

4. The camera rotation device of claim 1, wherein the first axis is orthogonal to the second axis.

5. The camera rotation device of claim 1, wherein said first rotation drive mechanism further includes a first gear mechanism having a first end directly engaging said first motor and having a second end directly engaging said main base, wherein said second rotation drive mechanism further includes a second gear mechanism having a first end directly engaging said second motor and having a second end directly engaging said first rotatable member, and wherein at least one of said first gear mechanism and said second gear mechanism includes only spur gears.

6. The camera rotation device of claim 5, wherein both said first gear mechanism and said second gear mechanism include only spur gears, each of said spur gears of said first gear mechanism having an axis of rotation parallel to the first axis, each of said spur gears of said second gear mechanism having an axis of rotation parallel to the second axis.

7. The camera rotation device of claim 1, wherein said first rotation drive mechanism further includes a first gear mechanism having a first end spur gear fixed to said main base and having at least one intermediate spur gear between said first motor and said first end spur gear, and wherein said second rotation drive mechanism further includes a second gear mechanism having a second end spur gear fixed to said first rotatable member and having at least one intermediate spur gear between said second motor and said second end spur gear.

8. The camera rotation device of claim 7, wherein at least one spur gear of said first gear mechanism and at least one spur gear of said second gear mechanism are interchangeable.

9. The camera rotation device of claim 1, further comprising a camera retainer mounted to said second rotatable member, and a camera supported by said camera retainer.

10. A camera rotation device, comprising:
  a main base;
  a first rotatable member mounted to said main base and operable to rotate about a first axis with respect to said main base;
  a first rotation drive mechanism mounted to said first rotatable member and operable to rotate said first rotatable member about the first axis, said first rotation drive mechanism including a first motor and including a first gear mechanism having a first end directly engaging said first motor and having a second end directly engaging said main base;
  a second rotatable member mounted to said first rotatable member and operable to rotate about a second axis with respect to said first rotatable member; and
  a second rotation drive mechanism mounted to said second rotatable member and operable to rotate said second rotatable member about the second axis, said second rotation drive mechanism including a second motor and including a second gear mechanism having a first end directly engaging said second motor and having a second end directly engaging said first rotatable member;
  wherein at least one of said first gear mechanism and said second gear mechanism includes only spur gears.

11. The camera rotation device of claim 10, further comprising a camera mounted to said second rotatable member, wherein said first rotatable member, said second rotatable member, and said camera are arranged so that an optical axis of said camera intersects an intersection of the first axis and the second axis.

12. The camera rotation device of claim 11, wherein the first axis is orthogonal to the second axis.

13. The camera rotation device of claim 10, wherein the first axis is orthogonal to the second axis.

14. The camera rotation device of claim 10, wherein said first rotation drive mechanism further includes a first rotation unit including a pair of spaced-apart plates attached to said first rotatable member, said first gear mechanism includes only spur gears arranged between said plates of said first rotation unit.

15. The camera rotation device of claim 14, wherein said first motor is attached to at least one of said plates of said first rotation unit.

16. The camera rotation device of claim 10, wherein said second rotation drive mechanism further includes a second rotation unit including a pair of spaced-apart plates attached to said second rotatable member, said second gear mechanism includes only spur gears arranged between said plates of said second rotation unit.

17. The camera rotation device of claim 16, wherein said second motor is attached to at least one of said plates of said second rotation unit.

18. The camera rotation device of claim 10, wherein both said first gear mechanism and said second gear mechanism include only spur gears, each of said spur gears of said first gear mechanism having an axis of rotation parallel to the first axis, each of said spur gears of said second gear mechanism having an axis of rotation parallel to the second axis.

19. The camera rotation device of claim 10, wherein said first gear mechanism has a first end spur gear fixed to said main base and has at least one intermediate spur gear between said first motor and said first end spur gear, and wherein said second gear mechanism has a second end spur gear fixed to said first rotatable member and has at least one intermediate spur gear between said second motor and said second end spur gear.

20. The camera rotation device of claim 19, wherein at least one spur gear of said first gear mechanism and at least one spur gear of said second gear mechanism are interchangeable.

21. The camera rotation device of claim 10, further comprising a camera retainer mounted to said second rotatable member, and a camera supported by said camera retainer.

* * * * *